United States Patent [19]

Kinder et al.

[11] Patent Number: 4,544,650
[45] Date of Patent: Oct. 1, 1985

[54] PROCESS FOR MANUFACTURING HYDROPHOBIC ADSORBENTS

[75] Inventors: Reiner Kinder, Leipzig; Johannes Teubel, Freiberg; Herbert Schuster; Christine Fanslau, both of Leipzig, all of German Democratic Rep.

[73] Assignee: Institut For Energetik Zentralstelle Fur Rationelle Energieanwendung, Leipzig, German Democratic Rep.

[21] Appl. No.: 614,919

[22] Filed: May 29, 1984

[30] Foreign Application Priority Data

May 27, 1983 [DD] German Democratic Rep. ... 251338

[51] Int. Cl.$^4$ .................... B01J 20/08; B01J 20/20; C01B 31/12
[52] U.S. Cl. .................... 502/424; 264/29.3; 264/29.7; 502/417; 502/423; 502/426; 502/437
[58] Field of Search .............. 502/182, 406, 407, 413, 502/405, 417, 423–427, 437; 264/29.1, 29.3, 29.4, 29.6, 29.7

[56] References Cited

U.S. PATENT DOCUMENTS

| | | | |
|---|---|---|---|
| 1,549,867 | 8/1925 | Graveman | 264/29.7 |
| 2,892,240 | 6/1959 | Frankenhoff | 502/407 |
| 3,152,985 | 10/1964 | Stoertz | 502/437 |
| 3,886,093 | 5/1975 | Dimitri | 502/417 |
| 4,206,078 | 6/1980 | Ohorodnik et al. | 502/182 |
| 4,440,867 | 4/1984 | Sabherwal | 502/401 |

FOREIGN PATENT DOCUMENTS

| | | | |
|---|---|---|---|
| 55-3804 | 1/1980 | Japan | 264/29.1 |
| 57-95816 | 6/1982 | Japan | 264/29.3 |
| 2082960A | 3/1982 | United Kingdom | 264/29.3 |

*Primary Examiner*—P. E. Konopka
*Attorney, Agent, or Firm*—Karl F. Ross; Herbert Dubno

[57] ABSTRACT

A composite mass with a major proportion of inorganic material and a minor proportion of organic material, preferably from industrial waste products, is activated by dehydration of its organic constituents whereupon the mass is subjected to a two-phase pyrolytic process. In a first stage, lasting for 2 to 3 hours it is heated to about 600° C. with carbonization of the organic constituents; in a second stage, lasting for 1 to 2 hours, the mass is sintered or consolidated at a temperature between about 900° and 1150° C.

6 Claims, No Drawings

PROCESS FOR MANUFACTURING HYDROPHOBIC ADSORBENTS

FIELD OF THE INVENTION

Our present invention relates to a process for manufacturing a hydrophobic adsorbent.

BACKGROUND OF THE INVENTION

The most widely used hydrophobic adsorbent today is activated carbon which has the advantage of large specific inner surface and a very wide heterogeneous pore spectrum. These properties are particularly useful in the purification of air and water for which such adsorbents are highly qualified.

Unfortunately, activated carbon is rather expensive and its manufacture is based on shrinking resources such as peat, low-temperature lignite and wood. The trend today, therefore, is to move away from these raw materials in favor of more abundant substances, including industrial waste products. By way of example we may mention G.D.R. (East German) patents WP No. 138,012 and No. 138,013, according to which high-temperature-lignite coke is used for the making of activated carbon, and WP No. 138,011, describing the utilization of partly carbonized ash xylite from power-plant residues as starting material for this purpose. The manufacture of an adsorbent from xylite by an alkalinic-thermal treatment is disclosed in G.D.R. patent application No. 01 J 240209/2. G.D.R. patent No. AP 85,317 describes hydrophobic mineralic adsorbents whose adsorptive effects, however, are restricted to retention of liquids immiscible with water.

Other known adsorbents are the so-called carbon molecular sieves, obtained for specific fields of use by a thermal decomposition of organic polymers, and in a broader sense the macroporous ion-exchange resins which, however, are hardly utilized for waste-water purification.

Additional drawbacks of adsorbents consisting essentially of carbon, besides their high cost, are their low temperature stability, their high affinity for oxygen and their limited regenerability.

Repeated regenerability, in fact, is an important requirement for the utilization of an adsorbent in gas and water purification. A reactivation of activated carbon laden with organic substances calls for temperatures of at least 600° C. The ignition temperature of commercial coal, however, lies between 200° and 400° C. so that a regeneration at these high temperatures necessarily involves a loss of material which in each instance may range between 5 and 15%. This further entails a reduction in active surface of up to about 20%, which imposes a definite limit on the number of possible regenerations.

OBJECTS OF THE INVENTION

The general object of our present invention is to provide a process for the manufacture of hydrophobic adsorbents which obviate the aforedescribed drawbacks of conventional adsorbents, have a higher mechanical and thermal stability in comparison with known carbonaceous hydrophobic adsorbents, are highly resistant to oxidation and can be manufactured at low material and processing costs.

A more particular object is to provide a process for making adsorbents of this character which have a large specific surface, preferably in excess of 100 m$^2$/g, and have a regenerability ratio of at least 10:1 with reference to activated carbon.

A further object is to provide a process for the purpose set forth which uses, as its starting materials, inorganic-containing waste products such as, for example, flocculation sludges from waste-water-purification plants, filter ashes especially from lignite-burning power plants or residues from the processing of lignite, old rubber, waste sulfite liquor and the like.

SUMMARY OF THE INVENTION

Our improved process for the manufacture of hydrophobic adsorbents involves, as a first step, the provision of a mixture of solid inorganic and organic constituents. In a second step, the organic constituents are dehydrated to produce an activated mass. The mass can be dehydrated by being heated in a nonoxidizing (inert or reducing) atmosphere to an elevated temperature on the order of 600° C. at which it is maintained for an extended period, preferably lasting for about 2 to 3 hours, to carbonize its organic constituents, i.e. produce water vapor and to split hydrogen and oxygen from the organic constituents. In the next step the mass is further heated to a higher temperature, between about 900° C. and 1150° C., at which it is maintained for an extended postcarbonization period, preferably lasting for about 1 to 2 hours, to sinter the mass into a coherent body unless the inorganic constituents are already in the form of a coherent matrix or skeleton as described hereinafter. In any case, the postcarbonization or consolidation period eliminates volatile components of the organic matter and insures the retention of its carbon in the interstices of the inorganic structure.

The organic constituents preferably constitute a minor fraction of the original mixture, equaling—in terms of their carbonization residue—up to about 50% by weight of the amount of the predominating inorganic constituents. A dehydrant added to the mixture, as noted above, ought not to exceed about 100% by weight of the carbonization residue of the organic matter.

Basically, we may distinguish between a direct method and an indirect method of implementing our present process. With the direct method, mineralic starting materials—if not initially accompanied by organic matter—are blended with carbonaceous materials to which inorganic salts or acids may be added as dehydrants. By the indirect method, we start with a coherent inorganic matrix of high porosity, preferably greater than 50%, a compressive strength which at the minimum ought to be about 1.0 MPa (megapascal), and a specific surface which should exceed 100 m$^2$/g as noted above. Such a matrix can be produced by a process which is the subject matter of our concurrently filed application Ser. No. 614,920 whose disclosure is incorporated by reference into our present application. In the first step of this indirect method, the matrix is impregnated with carbonaceous material to which inorganic salts or acids may again be added as dehydrants. With either method, after the two-phase pyrolytic treatment encompassing the heating-up, carbonization and consolidation periods already discussed, the added dehydrant is elutriated with water which may be somewhat acidified; after drying, the composite body may be subjected to further treatment—possibly grinding—making it suitable for its intended use.

Other features of our invention will become apparent from the following examples.

EXAMPLE I

Carbon-containing matter (e.g. tar or other bituminous material possibly admixed with old rubber; fatty acids or their residues; molasses; or waste sulfite liquor) is admixed with zinc chloride acting as a dehydrating agent and amounting up at most 100% by weight of the carbonization residue to the organic matter. For thorough blending, the zinc chloride is added either at an elevated temperature or upon dissolution in a small amount of water. Into this mixture we introduce a mineral substance in the form of fly ash, e.g. a precipitate from electrostatic power-plant filtration, in a proportion up to twice the amount by weight of the aforementioned carbonization residue. The mass thus obtained is shaped into cylindrical bodies and is heated for an hour in a muffle furnace, under an inert atmosphere, to 600° C. at which temperature it is maintained for a period between about 30 and 60 minutes. Thereafter, the bodies are further heated for an hour to a higher temperature between 1000° and 1100° C. at which they are left for an additional 15 to 30 minutes. They are then cooled and elutriated with dilute hydrochloric acid.

In the following Table we have listed, for purposes of comparison, several carbon-containing materials with their specific surface (in $m^2/g$) and their relative surfaces, i.e. the ratios of surface area ($m^2$) per gram (g) of carbonaceous matter, with or without the mineral matter introduced in accordance with our present invention. The addition of this mineral matter will be seen to yield an increase of up to about 75% in that relative surface.

TABLE

| Carbon-Containing Material | Specific Surface ($m^2/g$) | Relative Surface ($m^2/g$) | |
|---|---|---|---|
| | | without added minerals | with added minerals |
| Waste sulfite liquor | 390 | 330 | 585 |
| Modified bitumen | 209 | 208 | 314 |
| Residue of phenol-Solvan extract | 280 | 131 | 210 |

EXAMPLE II

A porous inorganic matrix as described above, produced in accordance with the teachings of our concurrently filed application, is impregnated to saturation with carbon-containing materials to which zinc chloride has been added in a proportion of up to 100%, by weight, of the carbonization residue of the organic matter. The matrix so impregnated is heated under an inert gas within an hour to 600° C., is maintained for up to an hour at this temperature, is thereafter heated for an hour to a higher temperature of 1000° C. and is maintained at the latter temperature for up to 90 minutes. The finished body is then cooled elutriated and dried as in Example I.

The specific surface of this body is found to be 235 $m^2/g$ with the use of waste sulfite liquor and 285 $m^2/g$ with the use of a residue of phenol-Solvan extract.

We claim:

1. A process for manufacturing a hydrophobic adsorbent, comprising the steps of:
    (a) mixing fly ash and an organic constituent selected from the group which consists of bituminous material, rubber, fatty acids and residues thereof, molasses and waste sulfite liquor residue to form a mixture of solid inorganic and organic constituents;
    (b) dehydrating said organic constituents in said mixture by combining zinc chloride with said mass and heating said mass to a temperature of about 600° C. in a nonoxidizing atmosphere and maintaining said temperature for a period of time sufficient to carbonize said organic constituents and transform said mixture into an activated mass; and
    (c) thereafter heating said mass to a higher temperature between substantially 900° C. and 1150° C. and maintaining said mass at said higher temperature for a postcarbonization period sufficient to consolidate said mass.

2. The process defined in claim 1 wherein the proportion of fly ash in said mixture is greater than that of said organic constituent.

3. The process defined in claim 1 wherein the heating in step (b) is carried out for a period of about 2 to 3 hours and the heating in step (c) is carried out for a period of about 1 to 2 hours.

4. The process defined in claim 1 wherein the amount of said organic constituent in said mixture in terms of the carbonization residue thereof is equal to at most about 50% by weight of the amount of said fly ash, and the amount of the zinc chloride added in said mixture equals at most about 100% by weight of said carbonization residue.

5. The process defined in claim 1 wherein said organic constituent is combined with the zinc chloride prior to the addition of the fly ash to form the mixture.

6. The process defined in claim 1 wherein said fly ash forms a porous matrix which is impregnated with said organic constituent in step (a).

* * * * *